United States Patent Office 2,792,396
Patented May 14, 1957

2,792,396

PYRIDAZINE CARBOXYLIC ACID ESTERS

Jean Druey, Riehen, and Alexander Staehelin, Basel, Switzerland, assignors to Ciba Pharmaceutical Products, Inc., Summit, N. J.

No Drawing. Application March 24, 1955,
Serial No. 496,616

Claims priority, application Switzerland April 15, 1954

10 Claims. (Cl. 260—250)

This invention relates to alkyl esters of 1,4-dihydro-4-oxo-1-R-pyridazine-3-carboxylic acids and their manufacture, in which R represents an unsaturated heterocyclic monocyclic radical, for example, a thiazolyl, thienyl, and especially a pyridyl radical. These esters are derived advantageously from lower alkanols, such as, for example, methanol or ethanol and may contain further substituents, advantageously lower alkyl radicals in the 6-position of the pyridazine ring, for example, methyl, ethyl or propyl radicals, especially methyl.

The invention relates more particularly to esters of the formula

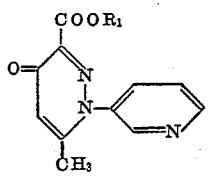

in which $R_1$ represents a lower alkyl radical, as for example, 1,4-dihydro-4-oxo-6-methyl-1-pyridyl-(3')-pyridazine-3-carboxylic acid methyl ester and 1,4-dihydro-4-oxo-6-methyl-1-pyridyl-(3')-pyridazine-3-carboxylic acid ethyl ester.

These compounds possess valuable pharmacological properties. Thus they exhibit a strong analeptic action and are useful as analeptic agents.

The new esters are obtained by converting a 1,4-dihydro-4-oxo-1-R-pyridazine-3-carboxylic acid or a functional derivative thereof or a salt thereof into a carboxylic acid alkyl ester. Thus, the aforesaid acid or a derivative thereof may be reacted, for example, with an alkanol or a reactive derivative thereof, such as a metal alcoholate or if desired a reactive ester, especially one of a strong inorganic or organic acid, and above all, of a hydrohalic acid. Another process consists in reacting the carboxylic acid with a diazo-alkane or another appropriate organic diazo compound.

The reactions may be carried out in the presence or absence of a diluent or a catalyst or condensing agent, at room or elevated temperature, in an open vessel or a closed vessel under pressure.

The starting materials, namely, the 1,4-dihydro-4-oxo-1-R-pyridazine-3-carboxylic acids can be prepared, for example, by treating the correspondingly substituted 2,4-dioxo-3-hetero-cyclyl-azo-2,3-dihydro-pyranes with a hydrolyzing agent, especially an alkaline agent. These acids are also new.

The new esters can be used as medicaments, for example, in the form of pharmaceutical preparations which contain the esters in admixture with an adjuvant facilitating the administration thereof, e. g., a pharmaceutical organic or inorganic carrier suitable for enteral or parenteral administration. As carriers there are used substances which do not react with the new compounds, for example, gelatine, lactose, starches, magnesium stearate, talc, vegetable oil, benzyl alcohols, gums, polyalkylene glycols, petroleum jelly, cholesterol and other known carriers for medicaments. The pharmaceutical preparations may be, for example, in the form of tablets, dragees, or in liquid form as solutions, suspensions or emulsions. If desired, they may be sterilized and/or contain auxiliary substances, such as preserving agents, stabilizing agents, wetting or emulsifying agents, salts for regulating the osmotic pressure or buffers. They may also contain other therapeutically valuable substances. The preparations are made by the usual methods employed in pharmaceutical formulation.

The following examples illustrate the invention, the parts being by weight unless otherwise stated, and the relationship of parts by weight to parts by volume being the same as that of the gram to the cubic centimeter:

Example 1

10.6 parts of 1,4-dihydro-4-oxo-6-methyl-1-pyridyl-(3')-pyridazine-3-carboxylic acid are heated in 40 parts by volume of absolute ethanol with 5 parts by volume of concentrated sulfuric acid for 10 hours on the water bath under reflux. The reaction mixture is poured on to ice water and extracted 5 times with methylene chloride. The organic solution is then washed with a dilute solution of sodium carbonate, then dried and evaporated. The residue is recrystallized from absolute ethanol. In this manner there is obtained 1,4-dihydro-4-oxo-6-methyl-1-pyridyl-(3')-pyridazine-3-carboxylic acid ethyl ester of the formula

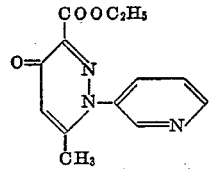

in the form of white crystals melting at 168–170° C. The yield is 48%.

The acid used as starting material may be prepared as follows:

14.4 parts of 3-aminopyridine are dissolved in 100 parts by volume of water and 50 parts by volume of concentrated hydrochloric acid, and a solution of 10.5 parts of sodium nitrite in 30 parts by volume of water is added dropwise, while stirring, at a temperature between —5° C. and 0° C. The diazo-solution is then slowly added, while further stirring, to a solution of 19.3 parts of 2:3-dihydro-2:4-dioxo-6-methyl-pyrane, 19.3 parts of sodium carbonate and 350 parts by volume of water at 0–5° C., the pH value of the solution being maintained between 4 and 5. The precipitated dyestuff is filtered off with suction and washed. It is heated, while still moist, in a solution of 2.8 parts of sodium hydroxide in 60 parts by volume of water and 30 parts by volume of ethanol for ½ hour under reflux, then the mixture is mixed with water, and after standing for a short time it is filtered over animal carbon and given a pH value of 2–3 by the addition of 2 N-hydrochloric acid. The acid solution is extracted several times with methylene chloride. The dried organic solution is evaporated, and the residue is recrystallized from a mixture of ethanol and water. In this manner there is obtained 1:4-dihydro-4-oxo-6-methyl-1-pyridyl-(3')-pyridazine-3-carboxylic acid of the formula

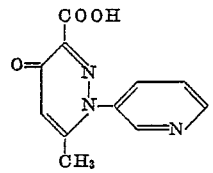

melting at 202–203° C. The yield is 78%.

Example 2

14 parts of 1:4-dihydro-4-oxo-6-methyl-1-pyridyl-(3')-pyridazine-3-carboxylic acid in 200 parts by volume of methanol are slowly mixed with 200 parts by volume of a solution of excess diazo-methane in ether. After allowing the mixture to stand for several hours the ester which crystallizes out is filtered off with suction, and the solution is evaporated to one half of its volume. After cooling, a further portion of the ester can be obtained. By recrystallization from methanol or ethyl acetate there is obtained 1:4-dihydro-4-oxo-6-methyl-1-pyridyl-(3')-pyridazine-3-carboxylic acid methyl ester of the formula

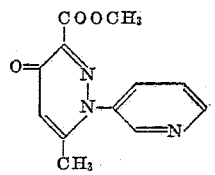

melting at 169–171° C. The yield is 75%.

Example 3

0.2 part of 1:4-dihydro-4-oxo-6-methyl-1-thiazolyl-(2')-pyridazine-3-carboxylic acid is dissolved in 20 parts by volume of methanol and slowly mixed with 15 parts by volume of a solution of excess diazo-methane in ether. After one hour the solution is completely evaporated. The brown crystalline residue is dissolved in hot ethyl acetate, the solution treated with charcoal, filtered and mixed with petroleum ether, whereupon the ester crystallizes in the form of needles. By recrystallization from methanol or a mixture of ethyl acetate and petroleum ether there is obtained the 1:4-dihydro-4-oxo-6-methyl-1-thiazolyl-(2')-pyridazine-3-carboxylic acid methyl ester of the formula

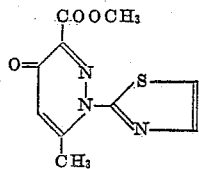

in the form of white needles of melting point 152–154° C. The yield is 61%.

The acid used as starting material can be obtained as follows:

10 parts of 2-amino-thiazole are dissolved in 35 parts by volume of water and 22 parts by volume of concentrated hydrochloric acid, and a solution of 7 parts of sodium nitrite in 40 parts by volume of water is added while stirring at a temperature between —5 and 5° C. The diazo-solution is then slowly added, while further stirring, to a solution of 12.6 parts of 2:3-dihydro-2:4-dioxo-6-methyl-pyrane, 12.6 parts of sodium carbonate and 200 parts by volume of water at 5–10° C. As soon as the solution becomes acid the dyestuff precipitates; it is filtered off with suction and washed. It is heated, while still moist, in a solution of 4.5 parts of sodium hydroxide in 100 parts by volume of water and 75 parts by volume of ethanol for an hour and a half under reflux, then the mixture is mixed with 600 parts by volume of ice water, and acidified with 2 N-hydrochloric acid. The acid solution is extracted several times with methylene chloride.

The dried organic solution is evaporated and the residue recrystallized from ethanol. There is thus obtained the 1:4-dihydro-4-oxo-6-methyl-2-thiazolyl - (2') - pyridazine-3-carboxylic acid of the formula

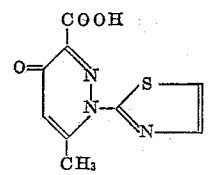

of melting point 176–178° C.

Example 4

Tablets of the following composition are made up for oral administration:

|  | Mg. |
|---|---|
| 1,4-dihydro-4-oxo-6-methyl-1-pyridyl - (3') - pyridazine-3-carboxylic acid ethylester | 50.00 |
| Gelatine | 2.00 |
| Lactose | 80.00 |
| Starch | 60.00 |
| Magnesium stearate | 1.00 |
| Talcum | 7.00 |
|  | 200.00 |

What is claimed is:

1. 1,4 - dihydro - 4 - oxo - 1 - R - pyridazine - 3 - carboxylic acid alkyl esters in which R represents a member selected from the group consisting of pyridyl and thiazolyl radicals.

2. 1,4 - dihydro - 4 - oxo - 6 - lower alkyl - 1 - R-pyridazine - 3 - carboxylic acid lower alkyl esters in which R represents a member selected from the group consisting of pyridyl and thiazolyl radicals.

3. Esters of the formula

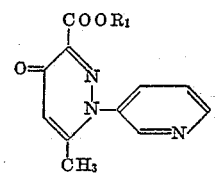

in which $R_1$ stands for a lower alkyl radical.

4. 1,4 - dihydro - 4 - oxo - 6 - methyl - 1 - pyridyl-(3')-pyridazine - 3 - carboxylic acid methyl ester.

5. 1,4 - dihydro - 4 - oxo - 6 - methyl - 1 - pyridyl-(3')-pyridazine-3-carboxylic acid ethyl ester.

6. 1,4 - dihydro - 4 - oxo - 6 - methyl - 1 - thiazolyl-(2')-pyridazine-3-carboxylic acid methyl ester.

7. 1,4 - dihydro - 4 - oxo - 1 - R - pyridazine - 3 - carboxylic acids, in which R represents a member selected from the group consisting of pyridyl and thiazolyl radicals.

8. 1,4 - dihydro - 4 - oxo - 6 - lower alkyl - 1 - R-pyridazine-3-carboxylic acids, in which R represents a member selected from the group consisting of pyridyl and thiazolyl radicals.

9. 1,4 - dihydro - 4 - oxo - 6 - methyl - 1 - pyridyl-(3')-pyridazine-3-carboxylic acid.

10. 1,4 - dihydro - 4 - oxo - 6 - methyl - 1 - thiazolyl-(2')-pyridazine-3-carboxylic acid.

No references cited